T. DRAKE.
Coffee Roaster.

No. 103,998. Patented June 7, 1870.

ATTEST.
Jas. H. Layman,
William Bauer

INVENTOR.
Thomas Drake
By his Attorneys
Knight Bros.

United States Patent Office.

THOMAS DRAKE, OF CINCINNATI, OHIO.

Letters Patent No. 103,998, dated June 7, 1870.

COMBINED ROASTER AND BROILER.

The Schedule referred to in these Letters Patent and making part of the same

I, THOMAS DRAKE, of Cincinnati, Hamilton county, Ohio, have invented a new and useful Convertible Coffee-Roaster and Meat-Broiler, of which the following is a specification.

Nature and Objects of the Invention.

My invention relates to a peculiarly constructed stirrer or agitator, and inclosing case or shell, mounted on a suitable open stand or base, and to an arrangement of such stand in conjunction with a grid or rack for broiling meat.

General Description with reference to the Drawing.

Figure 1:
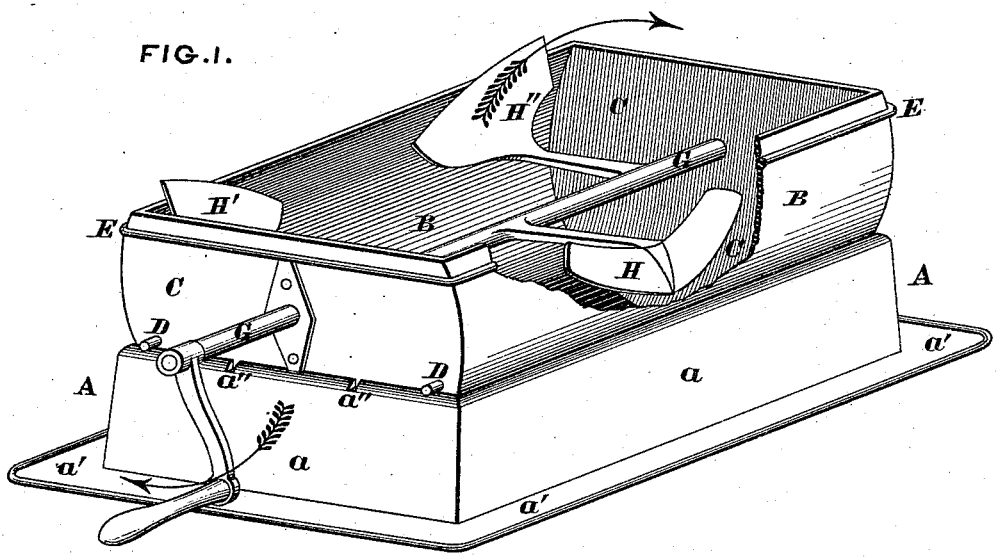
Figure 1 is a perspective view of my coffee-roaster without its cover, a portion of the shell or pan being broken away.
Figure 2:
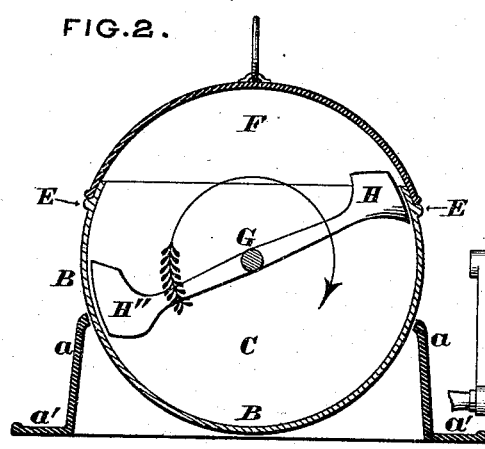
Figures 2 and 3 are a transverse and longitudinal section of the same in its covered condition.
Figure 3:
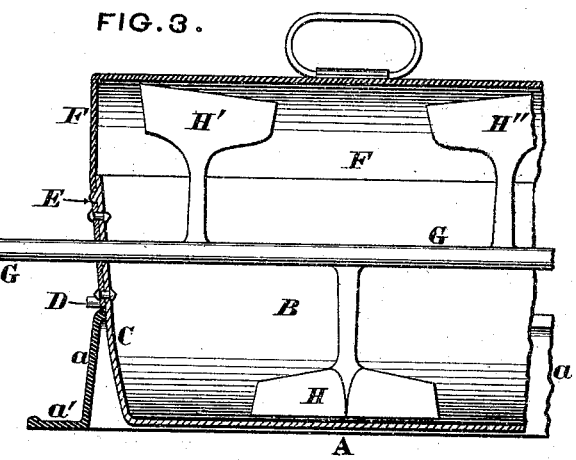
Figure 5:
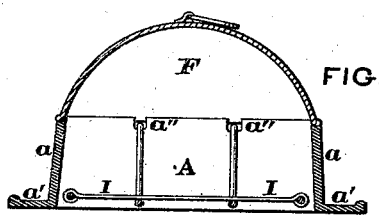
Figure 5 is a transverse section of the same, in its covered condition.
Figure 4:
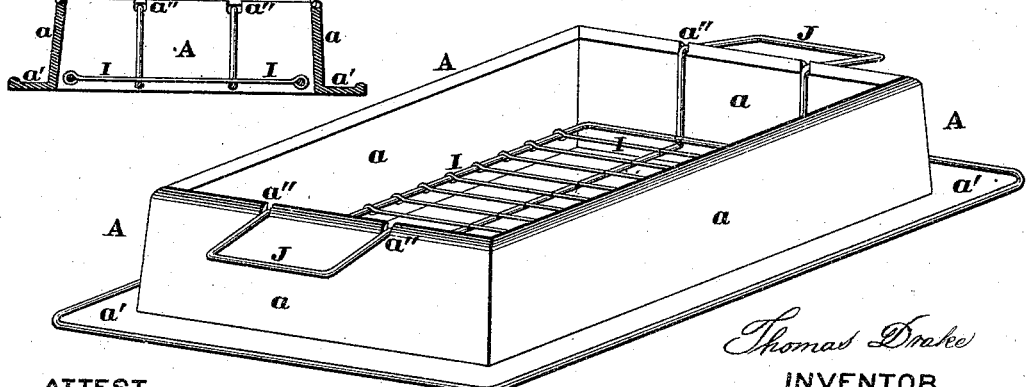
Figure 4 is a perspective view of my base or stand adapted for broiling.

A is my stand or base, consisting of four vertical, or nearly vertical walls, $a$, forming an open rectangle, and surrounded at bottom by a horizontal foot or flange $a'$. Each end of the said base has, in its top edge, two notches, $a''$, to receive the handles of the broiler.

Fitted to fill and occupy the opening of the base is a pan, B, having the form of a cylindrical segment of about two hundred and sixty degrees, or somewhat in excess of a semicircle.

This pan is furnished with heads, C, which converge or batter inwardly toward the bottom of the pan, in the manner represented, and projecting externally from these heads are pins or lugs, D, which, resting upon the top of the base, maintain the pan in a steady position thereon. Surrounding the pan, a little below its rim, is a bead, E, which, besides stiffening the pan, serves as a ledge to support a cover, F, which, with the pan B, forms a complete cylinder.

Journaled axially in the cylinder B F is the shaft C of my agitator G H H' H", armed with a central V-formed blade, H, and two oblique blades, H' H", as represented.

These blades revolve nearly in contact with the cylinder, and operate, by their revolution, to constantly scoop up the stratum of kernels in contact with the pan, and permit their place to be supplied by the less roasted particles, so as to produce a very even roasting action.

The pan B being somewhat in excess of a semi-cylindrical segment, the coffee is carried by the blades H H' H" to a position where its tendency is to fall away from the concave surface before reaching the joint or line of junction between the pan and cover, instead of choking and cutting by lodgement in said joint, as occurs in those roasters whose parting is in the horizontal plane of their axis, nor is the coffee liable to jam between the blades H' H" and the ends of the pan, as it would be were those ends vertical.

Formed to hang within the base A is a grid or rack, I, whose handles $j$ rest within notches $a''$, in the top edge of said base.

The cover F, fitting equally well on the pan B or on the base A, is available to confine the heat and fumes in either application of my improvement, whether as a coffee-roaster or as a meat-broiler.

Claim.

The convertible coffee-roaster and meat-broiler, substantially as set forth.

In testimony of which invention I hereunto set my hand.

THOMAS DRAKE.

Witnesses:
   GEO. H. KNIGHT,
   JAMES H. LAYMAN.